July 19, 1960
J. KOLBE
2,945,470
BANKING INDICATOR FOR MOTOR VEHICLES
Filed July 15, 1957
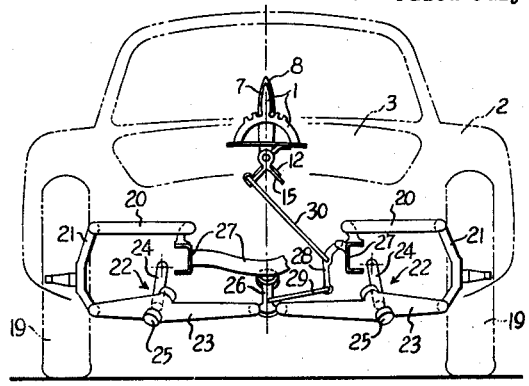
FIG. 1
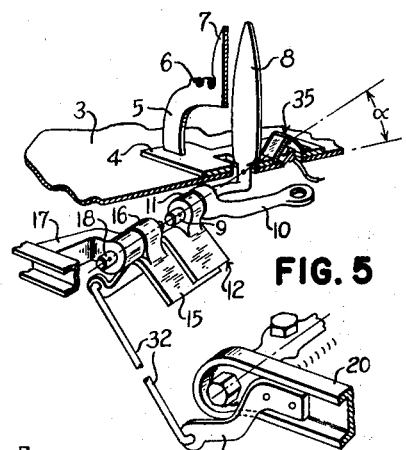
FIG. 5
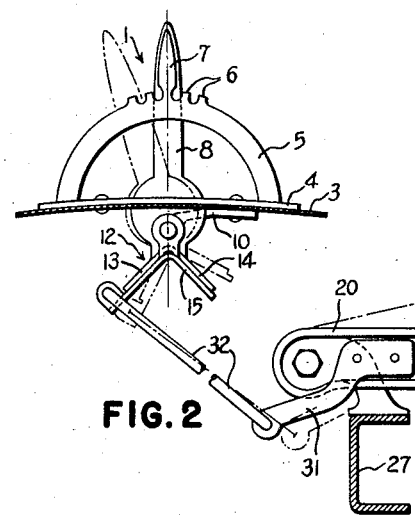
FIG. 2
FIG. 3
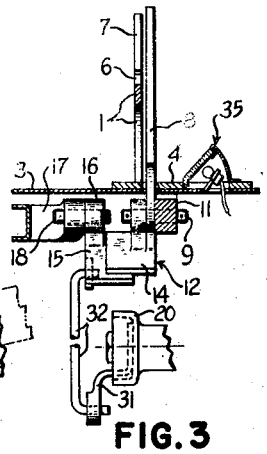
FIG. 6
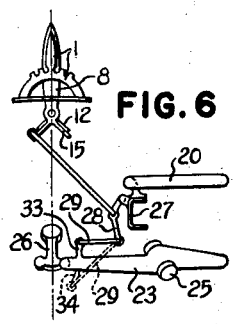
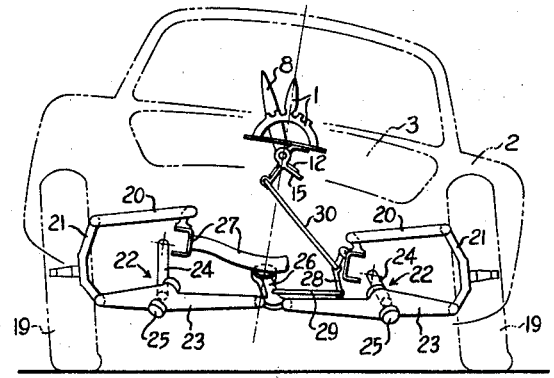
FIG. 4
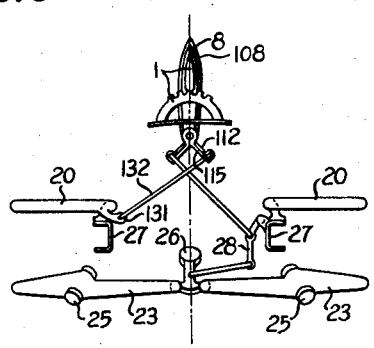
FIG. 7
INVENTOR.
JOACHIM KOLBE
BY Andrus, Scales
& Starke
Attorneys

United States Patent Office 2,945,470
Patented July 19, 1960

2,945,470

BANKING INDICATOR FOR MOTOR VEHICLES

Joachim Kolbe, R.R. 2, Box 179, Menomonee Falls, Wis.

Filed July 15, 1957, Ser. No. 672,059

9 Claims. (Cl. 116—28)

This invention relates to automotive vehicles and provides visual means, such as indicator mechanisms, to indicate the surface conditions of the road during travel of the vehicle, or the position of the superstructure and of the running gear of the vehicle relative to the road and to each other, to the passengers of the vehicle.

The invention is disclosed as adapted to cars leaning outwardly while negotiating turns as well as to so-called banking cars wherein the superstructure of the vehicle leans inwardly during curve ride.

Vehicles constructed to lean inwardly while negotiating turns are disclosed in a number of U.S. patents granted the present inventor. Patent No. Re. 21,605, issued October 22, 1940, disclosing link mountings, Patent No. 2,576,686, issued November 27, 1951, disclosing banking arms, as well as Patent No. 2,794,651, issued June 4, 1957, disclosing torsional acceleration hinges are referred to by way of example.

The principal object of the invention is to enable the passengers of an automobile to judge the surface condition of the road independent of false impressions resulting from highly developed wheel suspension systems, from unreliable light and shadow conditions, snow and soft surface conditions on the road. The mechanism provided for this purpose thereby serves as a safety device.

Where the invention is adapted to banking cars, an additional primary object is to enable the driver to relate the newly secured improved inward lean position of the superstructure to the outward lean position a non-banking car would assume under the same conditions of speed and turning radius, and to facilitate for the driver the transition from one kind of vehicle suspension to the other.

Another object of the invention is to provide for a visual mark of distinction, differentiation, and safety for vehicles thus controlled.

Another object is to indicate either in combination or separately to the driver of the vehicle the increments of side forces resulting either from centrifugal force, or from inclined transverse road profile or from unsymmetrical loading of the superstructure.

Where applied to banking cars, another object is to clearly indicate the faulty position of non-banking cars and to clarify the improvement achieved in banking cars, while marking the limit of safety for both kinds of vehicles. The device thereby becomes a means for the promotion of banking cars.

Another object is to provide such mechanism arranged to operate without interference with present vehicle service operation, such as opening of the hood.

Another object is to have indicated to the driver any shifting of load during the ride, a factor of special importance to commercial vehicles.

Another object is to provide means to judge the quality of suspension a given vehicle might have, by being informed without physical disturbance, of the wheel travel and oscillation actually taking place.

Another object is to provide a position and arrangement of the mechanism on the superstructure which will inform the driver of the relation between road and vehicle without being distracted from attentive driving.

Another object is to enable the driver of the vehicle to note fore to aft change in loading, as it occurs during acceleration and brake application and to compare the quality of suspension of different vehicles in that respect.

Since in non-banking vehicles outward lean of the superstructure during curve ride is simply a function of the loading of the resilient means supporting the vehicle, an indicator arranged to disclose spring deflection of at least one wheel in relation to a fixed mark such as a fixed indicator, will be sufficient for the driver to judge a given ride as related to spring deflection and to superstructure lean in general.

In banking cars, a similar indicator mechanism is mounted on the superstructure to first of all indicate the difference between the inward lean of a banking car and the position a superstructure of an outwardly leaning non-banking car would assume under equal ride conditions.

In banking cars, the newly achieved inward lean is only indirectly a function of the deflection of the resilient means of the vehicle. However, the indicator mechanism can be arranged to indicate both improvement of the superstructure position as compared to non-banking cars and wheel deflection during straight ahead ride, as described hereinafter.

Since for both non-banking and banking cars, two positions have to be indicated, outward lean and inward lean, with the final position of the superstructure representing, by means of a fixed indicator, one of these positions, and an oscillating indicator representing the other, the term "dual lean indicator" has been applied in the following to the oscillating indicator, without regard to the fact that for non-banking cars this indicator moves into a position inclined to the curve while the superstructure leans outwardly, while for banking cars, the dual lean indicator leans outwardly since the superstructure itself assumes the position inclined towards the curve. The dual lean indicator here serves only as a reminder of the faulty outward lean position for superstructures of non-banking cars and as a means of comparison.

The mechanism according to the invention, where incorporated into non-banking cars, might therefore well serve as a means of increasing a demand by the public for banking cars.

The accompanying drawings illustrates various embodiments of the invention and the manner of incorporating the device into banking and non-banking vehicles.

In the drawings:

Fig. 1 is a banking vehicle illustrated in front elevation and showing the dual lean indicator and its operating mechanism as arranged in relation to the front suspension;

Fig. 2 illustrates in enlarged front elevation the dual lean indicator and its connecting linkage according to the invention, similar to that shown in Fig. 1, but applied to a non-banking vehicle;

Fig. 3 illustrated the mechanism according to Fig. 2 shown in side elevation and partly in section;

Fig. 4 illustrates the vehicle according to Fig. 1 in a banked position, as when negotiating curves and showing the dual lean indicator mechanism in the position related to the position of the superstructure according to the invention;

Fig. 5 is a perspective view of a dual lean indicator and related linkage as applied to a non-banking vehicle, similar to that shown in Figs. 2 and 3;

Fig. 6 is a view illustrating some of the parts shown in Fig. 1 arranged as a modified embodiment of the invention; and Fig. 7 is a view illustrating some of the parts shown in Fig. 1 arranged as a further modified embodiment of the invention employing separate indicator systems for banking and for wheel oscillation.

All the drawings illustrate the invention with at least one fixed indicator 1 mounted on a superstructure 2 near the front of a vehicle hood 3. The indicator 1 comprises a base plate 4, an arc-like support member 5 with serrations 6 provided near its central upper edge and a vertically extending indicator blade 7 fixed at the center of member 5. A second indicator 8 is pivotally supported by a pin 9 journalled in a hinge bracket 10 secured to the hood 3 along with plate 4.

The second so-called dual lean indicator 8 extends vertically from the pivot pin 9 through the hood 3 and the base plate 4 either in front or behind the fixed indicator 1 and is arranged to substantially cover the fixed indicator 1 in zero position.

The pivot pin 9 extends longitudinally of the vehicle and hingedly supports by means of a hinge member 11 a depending abutment or transmission plate 12, rigidly attached to the indicator 8. The abutment or transmission plate 12 comprises two flange-like sections, 13 and 14, arranged approximately 90 degrees relative to each other and each extending at an angle of about 45 degrees relative to the road.

A second abutment or receiving plate 15, shaped identical to the plate 12 to fit snugly into it from below, with a rubber cushion arranged between the two plates where so desired, is pivotally supported on an axis coinciding with that of pivot pin 9 by a hinge member 16 secured to plate 15 and a hinge support 17 carried by any suitable member of the superstructure such as the vehicle main frame or the radiator or radiator frame as shown. The hinge support 17 may also be clamped to any one of these carriers for easy mounting and adaptability to varying car makes. A hinge pin 18 extends through member 16 and support 17 and is arranged to be in line with the pin 9 but separate therefrom to provide freedom of turning of plate 15 upon the same pivot axis as indicator 8 and plate 12.

The position of the receiving plate 15 in its turn about the hinge pin 18 is controlled by linkage means which is preferably adjustable, connecting the receiving plate 15 to suspension members of the vehicle running gear as described hereinafter.

The placing of the transmission plate 12 relative to the receiving plate 15 so as to fit snugly over it whenever the hood 3 is closed permits opening of the hood whenever desired and provides an operative drive of the indicator mechanism and turning of the indicator relative to indicator 1 when the hood is closed as under normal ride conditions.

The mechanism of the invention is employed as described above in both banking and non-banking vehicles.

Figs. 1 and 4 illustrate the arrangement for a banking car.

The car, as shown schematically in front elevation, comprises besides the structural members related to the invention and referred to above, the front wheels 19 and running gear therefor generally including upper wheel suspension control arms 20, wheel spindle members 21 and lower control arms 22. The arms 22 comprise transversely extending sections 23, longitudinally extending sections 24, illustrated in the drawing in perspective and as torsion springs, and so-called king pin banking hinges 25 interconnecting the transversely and the longitudinally extending sections of each arm, to provide roll banking arms supporting the superstructure.

A banking car suspension similar to the one described is disclosed in U. S. Patent No. 2,739,659, issued to the present inventor.

The inner ends of the lower control arms 22 are secured by means of ball and socket joints to the free end of a central support lever 26, also shown in the drawing in perspective, and which is pivotally carried at its opposite end by the superstructure 2, comprising the vehicle frame 27.

A horizontally pivoted vertically extending device lever 28 is pivotally carried by the frame and carries on its outer end by pivotal connection the tie rod 29 which is pivotally connected at its free end to the free end of central support lever 26. A second tie rod 30 is pivotally connected to the device lever 28 near its supporting hinge and pivotally connected to the receiving plate 15, a selected distance away from the plate support hinge pin 18.

In the operation of the device, as illustrated in Fig. 4, whenever the superstructure, under the influence of centrifugal force, moves into a banked position, the free end of the central support lever 26 turns about its hinged connection to the vehicle frame as the latter moves toward the outside of the curve, being arranged lower than the effective banking motion center for the vehicle, which center is located substantially in height of its center of mass.

During the turn of the lever 26, the device lever 28 operated by the tie rod 29, turns with its upper end towards the curve outside and lower end towards the curve inside relative to the frame 27, pulling the receiving plate 15 about the hinge pin 18. Simultaneously, the transmission plate 12 is forced to turn about the indicator hinge pin 9 and the dual lean indicator 8 turns into a direction opposite to that of the inward leaning banking car superstructure 2. The size of the angle opening up between the indicators 1 and 8, and read in degrees from the serrations 6 on the indicator support 5, indicates to the driver the banking improvement achieved, the amount of outward lean a non-banking vehicle would assume and the resulting spring deflection for either suspension system.

Where the device mechanism of the invention is incorporated into a non-banking vehicle, as illustrated in Figs. 2 and 3 and in the perspective of Fig. 5, the oscillation turn of the upper wheel-control arm 20 forming a part of the running gear for the vehicle is employed to operate the indicator 8. The arm 20 carries an arm extension 31 which may be clamped thereto and which is pivotally connected to the tie rod 32 hingedly connected to the receiving plate 15. The indicator 8 is turned during upward movement of the corresponding wheel, as will occur on the curve outside due to increased loading on that side, towards the inside of the curve as illustrated in Fig. 2 in broken outline, a position which will invite the driver to consider such position as desirable for the superstructure itself.

In Fig. 5, the direction of the common axis of pins 9 and 18 is illustrated inclined relative to the corresponding longitudinal hood profile, as indicated as angle alpha in section, to place the turning point of the indicator 8 into the height of the hood 3 or above the same, and to thereby keep the necessary opening in the hood to a minimum.

The fixed indicator 1 meanwhile leans with the whole superstructure towards the curve outside.

Again, the size of the angle opening up between the indicators 1 and 8 indicates to the driver the spring deflection he has to cope with. The driver will be familiar with the fact that during curve ride a shifting of load takes place and that an increase in deflection on one side is accompanied by a similar decrease in deflection on the other side so that the indicator in effect indicates the change for both sides.

While the dual lean indicator 8 where operated according to the linkage shown for banking vehicles in Figs. 1 and 4, will remain substantially free from direct influence due to wheel oscillation in straight ahead ride, such influence can be secured where desired, in two ways:

Fig. 6 illustrates the linkage for a banking car similar to that illustrated in Fig. 1, but with rod 29 pivotally attached on its inner end to an arm 33, which extends upwardly, or to an arm 34, illustrated in dotted outline as extending downwardly from the inner end of the lower control arm 22. Thereby both lateral turn of the central support lever 26 and oscillation swing of the lower suspension arm 22 will cause the indicator 8 to turn. Where the arm 33 extending upwardly is employed, a selected amount of indicator turn is added to the turn of the indicator resulting from banking. Where the arm 34 extending downwardly is employed, a selected amount of indicator turn is subtracted from the turn of the indicator resulting from banking.

In straight ahead ride, a small amount of wheel oscillation turn will constantly be indicated.

Fig. 7 illustrates a modified application of the invention with separate indications for the driver of banking and of wheel oscillation. The arrangement constitutes a combination of the devices illustrated in Figs. 1 and 5. Two operable indicators are shown and the reference characters used for the indicator mechanism employed to indicate wheel oscillation have been increased by adding 100 thereto.

In general, the tie rod linkage connecting the indicator mechanisms to selected members of the running gear can be placed in various suitable positions depending on space available and geometry layouts selected. Nonmechanical means such as hydraulic means, air pressure and electric means may be employed to transfer running gear movements to the indicator.

The construction of the pointers or indicators 1 and 8 may be of a self luminous or luminescent material either in the form of a plastic or of a coated metal, so that they can be readily seen at night, or, as shown in Figs. 3 and 5, a light 35 connected in the circuit for the vehicle headlights may be mounted on the plate 4 to shine a light beam upon the indicators 1 and 8.

The mechanisms described according to the invention disclose simple devices enabling the driver to judge the road and relationships between the road, the superstructure, and the vehicle running gear. Where applied to banking cars, they assist in judging the new angular movement of the superstructure by enabling the driver to compare it to conditions he is familiar with. In both cases, the mechanism constitutes a safety device of considerable importance. The importance will increase with the lowering of wheel rates and the introduction of vehicle load adjustment devices to be anticipated in the future.

Various modes of carrying out the invention are contemplated as within the scope of the following claims particularly pointing out and distinctly claiming the subject matter which is regarded as the invention.

I claim:

1. In a vehicle having a superstructure, and a wheel supported running gear having resilient means for the support of the superstructure upon the wheels and providing for vertical oscillation of the wheels relative to the superstructure; stationary indicator means rigidly carried by the superstructure, a second indicator hingedly carried by the superstructure and movable relative to said stationary indicator means, and linkage means connecting said second indicator to the running gear to actuate the indicator and indicate vertical oscillation of at least one of the wheels relative to the superstructure.

2. In a motor vehicle having a superstructure adapted to bank in turns, and a wheel supported running gear including resilient means for the support of the superstructure upon the wheels; a stationary indicator rigidly attached to the superstructure, a second indicator hingedly carried by the superstructure and movable relative to said first indicator, and linkage means connecting said second indicator to the running gear of the vehicle to actuate the indicator and indicate banking of the superstructure relative to the wheels as provided for by the running gear and express thereby outward lean which would occur in non-banking cars under equal ride conditions.

3. In a vehicle having a superstructure adapted to bank in turns, and a wheel supported running gear including resilient means for the support of the superstructure upon the wheels; a stationary indicator rigidly attached to the superstructure, a second indicator pivotally carried by the superstructure and movable relative to said first indicator, linkage means connecting said second indicator to structure within the running gear providing for oscillation of the wheels to actuate said second indicator in response to wheel oscillation of at least one front wheel relative to the superstructure, a third indicator pivotally carried by the superstructure and movable relative to said first and second indicators, and linkage means connecting said third indicator to structure within the running gear providing for banking of the superstructure to actuate said third indicator in response to banking of the superstructure to enable the driver to visualize the position a non-banking vehicle would assume under similar driving conditions, said indicators being normally superimposed in the absence of front wheel oscillation and of banking of the superstructure.

4. A road judge indicator for vehicles having a superstructure with a front engine hood hinged thereto, and a wheel supported running gear including resilient means supporting the superstructure; comprising a fixed indicator secured upon the forward end of the hood in view of the operator of the vehicle, a second indicator pivotally mounted on the hood and movable relative to said fixed indicator to visually inform the operator of lateral tilting of the superstructure relative to the wheels, means connecting said second indicator to said running gear to actuate said second indicator relative to said fixed indicator whereby tilting of the latter with the superstructure is indicated, said connecting means including a pivotal member carried by the superstructure in alignment with the pivotal axis of said pivotal indicator, and inter-engageable abutments on said member and indicator to actuate the latter in response to actuation of the former, said abutments being freely separable upon hinge movement of the hood and being engaged only when the hood is closed.

5. A road judge indicator for banking vehicles having a superstructure and a wheel supported running gear including resilient guide means for supporting the superstructure and for guiding the same into a banked position on turns; comprising a fixed indicator secured to the superstructure in view of the operator of the vehicle, a second indicator pivotally carried by the superstructure and movable relative to said first indicator to visually inform the operator of banking of the superstructure, means connecting said second indicator to said running gear to actuate said second indicator relative to said first indicator whereby tilting of the latter with the superstructure during banking serves to indicate the improvement obtained in banking effect, the connection of said last named means to said running gear including a link pivotally connected to said running gear, and a lever carried by the superstructure actuated by said link.

6. In a vehicle having a superstructure, and a wheel supported running gear having resilient means for the support of the superstructure upon the wheels and providing for vertical oscillation of the wheels relative to the superstructure; an indicator hingedly carried by the superstructure and movable relative to said superstructure, and linkage means connecting said indicator to the running gear to actuate the indicator and indicate vertical oscillation of at least one of the wheels relative to the superstructure.

7. In a vehicle having a superstructure adapted to bank in turns, and a wheel supported running gear including resilient means for the support of the superstructure upon the wheels; an indicator pivotally carried by the superstructure and movable relative to said superstructure, linkage means connecting said indicator to structure within the running gear providing for oscillation of the wheels to actuate said indicator in response to wheel oscillation of at least one front wheel relative to the superstructure, a second indicator pivotally carried by the superstructure and movable relative to said first indicator, and linkage means connecting said second indicator to structure within the running gear providing for banking of the superstructure to actuate said second indicator in response to banking of the superstructure to enable the driver to visualize the position a non-banking vehicle would assume under similar driving conditions, said indicators being normally superimposed in the absence of front wheel oscillation and of banking of the superstructure.

8. In a vehicle having a superstructure adapted to bank in turns, and a wheel supported running gear including resilient means supporting the superstructure; a fixed indicator provided by said superstructure, a movable indicator pivotally mounted on the superstructure and disposed to move relative to the superstructure, and means connecting said movable indicator to said running gear to actuate said movable indicator relative to said superstructure to visually inform the operator of lateral tilting of the superstructure relative to the wheels.

9. An indicator for banking vehicles having a superstructure and a wheel supported running gear including resilient guide means for supporting the superstructure and for guiding the same into a banked position on turns, said guide means including a central support lever for a pair of roll banking arms supporting the forward end of the running gear; comprising a fixed indicator provided by the superstructure and in view of the operator of the vehicle, a movable indicator pivotally carried by the superstructure and movable relative to said first indicator to visually inform the operator of banking of the superstructure, means connecting said movable indicator to said running gear to actuate said movable indicator relative to said first indicator whereby tilting of the superstructure relative to the movable indicator during banking serves to indicate the improvement obtained in banking effect, the connection between said last named means and said running gear including a lever carried by the superstructure and connected to said movable indicator to actuate the same, and a link connecting said lever and the central support lever for said banking arms whereby the banking effect of the superstructure is indicated.

References Cited in the file of this patent

UNITED STATES PATENTS

| | | |
|---|---|---|
| 1,285,331 | Nikonow | Nov. 19, 1918 |
| 1,804,490 | Bagge | May 12, 1931 |
| 1,973,936 | Tokukisa | Sept. 18, 1934 |
| 2,272,950 | Mercier | Feb. 10, 1942 |
| 2,794,651 | Kolbe | June 4, 1957 |

UNITED STATES PATENT OFFICE
CERTIFICATE OF CORRECTION

Patent No. 2,945,470                                         July 19, 1960

Joachim Kolbe

It is hereby certified that error appears in the printed specification of the above numbered patent requiring correction and that the said Letters Patent should read as corrected below.

Column 3, line 71, for "2,739,659" read -- 2,739,658 --.

Signed and sealed this 3rd day of January 1961.

(SEAL)
Attest:

KARL H. AXLINE                                        ROBERT C. WATSON
Attesting Officer                                      Commissioner of Patents